(12) United States Patent
Son et al.

(10) Patent No.: US 12,399,331 B2
(45) Date of Patent: *Aug. 26, 2025

(54) OPTICAL ASSEMBLY FOR OPTICAL TRANSCEIVER AND OPTICAL TRANSCEIVER USING SAME

(71) Applicant: OPTOMIND INC., Suwon-Si (KR)

(72) Inventors: Yung-sung Son, Yongin-si (KR); Hyun Ryong Cho, Suwon-si (KR); Sang-shin Lee, Seoul (KR); Young-geon Lee, Seoul (KR)

(73) Assignee: OPTOMIND INC., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/650,323

(22) Filed: Apr. 30, 2024

(65) Prior Publication Data

US 2024/0280770 A1 Aug. 22, 2024

Related U.S. Application Data

(63) Continuation of application No. 16/330,396, filed as application No. PCT/KR2018/013970 on Nov. 20, 2018, now Pat. No. 12,001,068.

(30) Foreign Application Priority Data

Jan. 9, 2018 (KR) ........................ 10-2018-0002750

(51) Int. Cl.
*G02B 6/42* (2006.01)
*H04B 10/40* (2013.01)

(52) U.S. Cl.
CPC ......... *G02B 6/4246* (2013.01); *G02B 6/4243* (2013.01); *H04B 10/40* (2013.01)

(58) Field of Classification Search
CPC ... G02B 6/4246; G02B 6/4251; G02B 6/4253
See application file for complete search history.

(56) References Cited

U.S. PATENT DOCUMENTS 6,553,173 B1 4/2003 Goto
7,272,291 B2 9/2007 Bayazit et al.
(Continued)

FOREIGN PATENT DOCUMENTS

JP 6243568 B1 12/2017
KR 10-2010-0045433 A 5/2010
(Continued)

*Primary Examiner* — Rhonda S Peace
(74) *Attorney, Agent, or Firm* — Harness, Dickey & Pierce, P.L.C.

(57) ABSTRACT

Embodiments of the present disclosure are directed to an optical assembly for optical transceiver which is composed of two separate sub-assemblies including an assembly that is coupled with a substrate and has a post formed to have a central hollow into a multi-branched shape, for increasing the optical alignment efficiency between the optical elements included in the optical assembly for optical transceiver which involves multiple complicated and sophisticated processes, the optical assembly for optical transceiver being structured to drain out the epoxy resin or the refractive index matching material used when coupling the optical fiber inserted from the outside with the optical elements, whereby greatly reducing optical alignment errors caused by the epoxy resin or refractive index matching material, as well as directed to an optical transceiver using the optical assembly for optical transceiver.

8 Claims, 8 Drawing Sheets

(56) References Cited

U.S. PATENT DOCUMENTS

| | | | | |
|---|---|---|---|---|
| 8,414,309 B2 * | 4/2013 | Meadowcroft | ...... | G02B 6/4214 |
| | | | | 439/71 |
| 9,645,331 B1 | 5/2017 | Kim | | |
| 9,766,416 B1 | 9/2017 | Kim | | |
| 12,001,068 B2 * | 6/2024 | Son | ...................... | G02B 6/4246 |
| 2010/0220957 A1 | 9/2010 | Asahi et al. | | |
| 2011/0268397 A1 | 11/2011 | Meadowcroft et al. | | |
| 2014/0151536 A1 | 6/2014 | Wu | | |
| 2018/0299630 A1 | 10/2018 | Son et al. | | |
| 2018/0306985 A1 | 10/2018 | Son et al. | | |
| 2024/0280770 A1 * | 8/2024 | Son | ........................ | H04B 10/40 |

FOREIGN PATENT DOCUMENTS

| KR | 10-2017-0071646 A | 6/2017 |
|---|---|---|
| WO | 2009119966 A1 | 10/2009 |

\* cited by examiner

OPTICAL ASSEMBLY FOR OPTICAL TRANSCEIVER AND OPTICAL TRANSCEIVER USING SAME

CROSS-REFERENCE TO RELATED APPLICATIONS

This application is a continuation of U.S. Ser. No. 16/330,396 filed Oct. 8, 2021, which is a U.S. National Phase Application under 35 U.S.C. 371 of International Application No. PCT/KR2018/013970, filed on Nov. 20, 2018, which claims the benefit of Korean Patent Application No. 10-2018-0002750, filed on Jan. 9, 2018. The entire disclosures of the above applications are incorporated herein by reference. Furthermore, this non-provisional application claims priority in countries, other than the U.S., with the same reason based on the Korean patent application, the entire content of which is hereby incorporated by reference.

TECHNICAL FIELD

Embodiments of the present disclosure relate to an optical assembly for optical transceiver and an optical transceiver using the same.

BACKGROUND

The statements in this section merely provide background information related to the present disclosure and do not necessarily constitute prior art.

There is a market demand increasing rapidly for transmission of large data files between devices as with data centers, cloud computing, high-performance computing (HPC), ultra-high definition (UHD) and three-dimensional visualization technologies. In addition, the constant increase in market demand for technology of optical interconnections such as rack-to-rack, board-to-board and chip-to-chip interconnections within a system has brought optical interconnect technology to the practical application and commercialization stages.

This trend is leading the increase of bandwidth of the digital interface standard between devices, such as Infini-Band, digital visual interface (DVI), high definition multimedia interface (HDMI), DisplayPort (DP) and USB 3.0. In addition, researches are being actively conducted on small-sized multi-channel optical modules capable of transmitting a large amount of information in order to expand the bandwidth of the digital interface standard between the devices.

In recent years, there has been an increasing demand for board-to-board optical connections in smart devices. Much effort has been devoted to mounting optical modules on smart devices.

However, optical communication technology, which is currently being used commercially, is based on long distance data transmission. Most manufacturers of optical communication components and systems are adapting long-distance optical communication technology to a short-distance optical communication system or a short-distance optical connection. This has been a reason for those inefficient short-distance optical communication systems or short-haul optical interconnect solutions produced by these optical component and system manufacturers.

Therefore, there is a need for a cost-effective optical interconnect solution suitable for short-distance optical communication systems. One of the most cost-effective optical interconnect solutions for high-capacity data transmission and short-haul optical connections is an optical transceiver module using a vertical resonance type semiconductor laser or vertical-cavity surface-emitting laser (VCSEL) and vertical-type photodiodes.

In order to perform optical coupling between an optical fiber and a VCSEL or a vertical-type photodiode, a path of light emitted from the VCSEL or light incident on the vertical-type photodiode should be changed by 90 degrees. An optical system such as a mirror or a prism is required for changing the optical path, and at least one lens is required to improve the optical coupling efficiency.

FIG. 1 is a schematic diagram of an optical system included in a conventional optical transceiver.

The optical system used the conventional optical transceiver includes a transmitter collimator lens 120, a transmitter reflection prism 130, a transmitter focusing lens 140, an optical fiber 150, a receiver collimator lens 160, a receiver reflection prism 170 and a receiver focusing lens 180. Here, the transmitter collimator lens 120, the transmitter reflection prism 130, the transmitter focusing lens 140 are components included in an optical transmitter, and the receiver collimator lens 160, the receiver reflection prism 170 and the receiver focusing lens 180 are components included in an optical receiver.

The light generated and emitted from a light source 110 has a predetermined radiation angle, is emitted in a direction perpendicular to the surface of the light source 110, and is incident on the transmitter collimator lens 120. The transmitter collimator lens 120 converts light incident from the light source 110 into light beams that travel in parallel one another. The transmitter reflection prism 130 changes the path of the light emitted from the transmitter collimator lens 120 by 90 degrees to the side where the optical fiber is. The transmitter focusing lens 140 serves to collect the light reflected by the transmitter reflection prism 130 into the optical fiber 150.

The light, that is transmitted from the optical fiber 150 and emitted, is incident on the receiver collimator lens 160 which changes the incident light into light beams traveling in parallel one another. As with the optical transmitter, the receiver reflection prism 170 changes and reflects the path of light by 90 degrees. The light reflected by the receiver reflection prism 170 is made incident on a photodiode 190 via the receiver focusing lens 180, and thereby the optical signal from the optical transmitter finally is delivered to the optical receiver.

The optical transmitter needs a distance equal to the focal length between the transmitter focusing lens 140 and the optical fiber 150 for the purpose of the optical coupling between the optical system and the optical fiber. Likewise, the optical receiver needs a length of optical path for forming parallel light beams between the optical fiber 150 and the receiver collimator lens 160. Therefore, a special optical fiber alignment mechanism is indispensable for setting these distances.

With such a conventional optical system, precise measuring instruments are necessary because the optical alignment process is required as described above. Additionally, in production of optical transceiver products, optical alignment and assembly performances are sensitive to deviation between the optical system mechanism and the optical fiber mechanism, which requires a very precise management of mechanism deviations.

The conventional optical system exposes the optical fiber 150 in the air, which renders the core of the optical fiber 150 to be susceptible to contamination with fine dust and foreign substances. Depending on the severity of the contamination, the optical coupling efficiency may be fatally influenced. In addition, the exposed core of the optical fiber 150 may generate additional optical coupling loss due to Fresnel loss, resulting in reduced reliability.

In addition, the optical coupling efficiency in the conventional optical system depends on the quality of the cross sectional cut of the optical fiber 150, which requires special processing of the cross section of the optical fiber 150. Unless these issues are resolved, products produced using conventional optical systems are highly likely to cause malfunction or failure. Those products, which are commercialized with these inherent deficiencies, cannot be assembled easily by using a complete passive alignment method.

In this way, elaborate arrangements between the light source 110 and the transmitter collimator lens 120, the transmitter collimator lens 120 and the transmitter reflection prism 130, the transmitter reflection prism 130 and the transmitter focusing lens 140, and the transmitter focusing lens 140 and the optical fiber 150 are needed to be controlled within a predetermined level of tolerance to attain high-quality optical transmission. This is also true in the case of optical reception where the light source 110 is replaced with the photodiode 190.

In other words, in order for the optical transmitter or the optical receiver to operate normally, four individual alignment factors need to be under sophisticated control. Further, time-consuming processes need to be eliminated to allow for mass production of optical assemblies.

Accordingly, a compact optical assembly for optical transceiver is necessary which enables a sophisticated and easy alignment of an optical assembly in optical transceivers for optical communications while allowing a passive alignment of the optical assembly, without requiring expensive equipment or a time-consuming process.

DISCLOSURE

Technical Problem

Embodiments of the present disclosure are directed to providing a compact optical assembly for optical transceiver that can be used in optical transceivers, which enables large capacity optical transmission.

Embodiments of the present disclosure provide an optical transceiver using an optical assembly for optical transceiver, which can be mass-produced at a reasonable price.

SUMMARY

At least one embodiment of the present disclosure provides an optical assembly for use in an optical transceiver and for mounting on a substrate, which includes a body assembly and a cover assembly. The body assembly includes a reflector configured to change a traveling direction of light moving in a z direction perpendicular to a plane formed by the substrate to a −x direction parallel to the substrate, a first lens group disposed between at least one optical element and the reflector to optically couple the at least one optical element and the reflector, a body hole that is an empty space formed at a position spaced apart from the reflector by a predetermined distance, and a surplus liquid guide groove configured to be adjacent to the body hole, and to drain out an overflow of liquid introduced into the body hole. The cover assembly includes a cover spacer inserted in the body hole in a −z direction, and a second lens group arranged on one side of the cover spacer, for optically coupling at least one optical fiber inserted from an outside in an x direction. An optical path is established through an interconnection between the at least one optical element, the first lens group, the reflector, the second lens group, the cover spacer and the at least one optical fiber, by coupling between the cover assembly and the body assembly, with a lower side portion of the cover assembly abutting an upper side portion of the body assembly.

Another embodiment of the present disclosure provides an optical transceiver composed of a substrate, at least one optical element formed on the substrate, a driving circuit for driving the at least one optical element, and at least one optical fiber, and the optical transceiver includes a body assembly and a cover assembly. The body assembly includes a reflector configured to change a traveling direction of light moving in a z direction perpendicular to a plane formed by the substrate to a −x direction parallel to the substrate, a first lens group disposed between the at least one optical element and the reflector to optically couple the at least one optical element and the reflector, a body hole that is an empty space formed at a position spaced apart from the reflector by a predetermined distance, and a surplus liquid guide groove configured to be adjacent to the body hole, and to drain out an overflow of liquid introduced into the body hole. The cover assembly includes a cover spacer inserted in the body hole in a −z direction, and a second lens group arranged on one side of the cover spacer, for optically coupling at least one optical fiber inserted from an outside in an x direction. An optical path is established through an interconnection between the at least one optical element, the first lens group, the reflector, the second lens group, the cover spacer and the at least one optical fiber, by coupling between the cover assembly and the body assembly, with a lower side portion of the cover assembly abutting an upper side portion of the body assembly.

Advantageous Effects

According to at least one embodiment of the present disclosure, an optical assembly for optical transceiver is composed of two separate sub-assemblies including an assembly that is coupled with a substrate and has a bottom post formed to have a central hollow into a multi-branched shape, for increasing the optical alignment efficiency between the optical elements included in the optical assembly for optical transceiver which involves multiple complicated and sophisticated processes.

According to another aspect of the embodiments of the present disclosure, an optical transceiver necessary for large-capacity high-speed optical transmission can be mass-produced at a low cost.

According to yet another aspect of the embodiments of the present disclosure, alignment can be easily achieved between a plurality of optical elements used in an optical transmitter or an optical receiver without expensive equipment or time-consuming processes.

Yet another aspect of the embodiments of the present disclosure provides an optical transceiver which is structured to drain out the epoxy resin or the refractive index matching material used when coupling the optical fiber inserted from the outside with the optical elements, whereby greatly reducing optical alignment errors caused by the epoxy resin or refractive index matching material.

Figure 1:
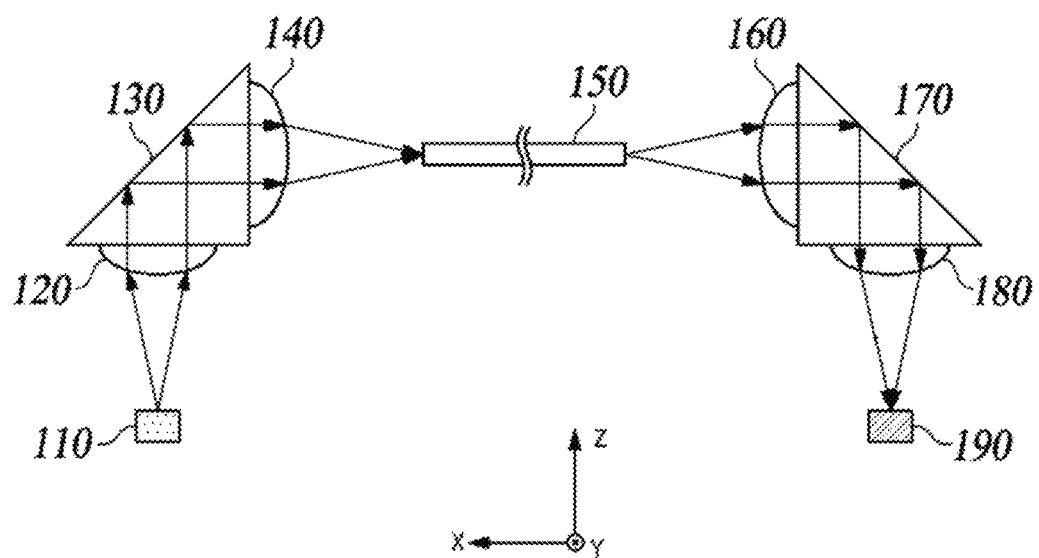
FIG. 1 is a schematic diagram of an optical system included in a conventional optical transceiver.

| Reference Numeral | |
|---|---|
| 110: light source | 210: electrical-optical conversion element |
| 120, 160, 220, 262: collimator lens | |
| 130, 170, 230, 270, 324: reflector | |
| 140, 180, 242, 280: focusing lens | |
| 150, 250: optical fiber | 190, 290: optical-electrical conversion element |
| 244, 264: spacer | 300: optical assembly for optical transceiver |
| 310: cover assembly | 310a: first cover groove |
| 310b: second cover groove | 310c: third cover groove |
| 310d: fourth cover groove | 311: cover spacer |
| 320: body assembly | 320a: first body post |
| 320b: second body post | 320c: third body post |
| 321, 323: main post | 322: reflector forming groove |
| 325, 327: sub-post | 328: body encapsulation region |
| 329: optical fiber guide | 390: substrate |
| 710: first lengthwise line | 720: first widthwise line |
| 730: second lengthwise line | 740: second widthwise line |
| 750: third vertical line | 1L: first lens group |
| 2L: second lens group | G: surplus liquid guide groove |

DETAILED DESCRIPTION

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, i), ii), a), b), etc., are used solely for the purpose of differentiating one component from the other, not to imply or suggest the substances, the order or sequence of the components. Throughout this specification, when a part "includes" or "comprises" a component, the part is meant to further include other components, not excluding thereof unless specifically stated to the contrary.

Hereinafter, an optical assembly for optical transceiver or simply an optical assembly according to some embodiments of the present disclosure will be described with reference to the accompanying drawings. Further, for the sake of clarity, the description will be provided with reference to the Cartesian coordinate system defined in the x direction, y direction and z direction.

Figure 2:
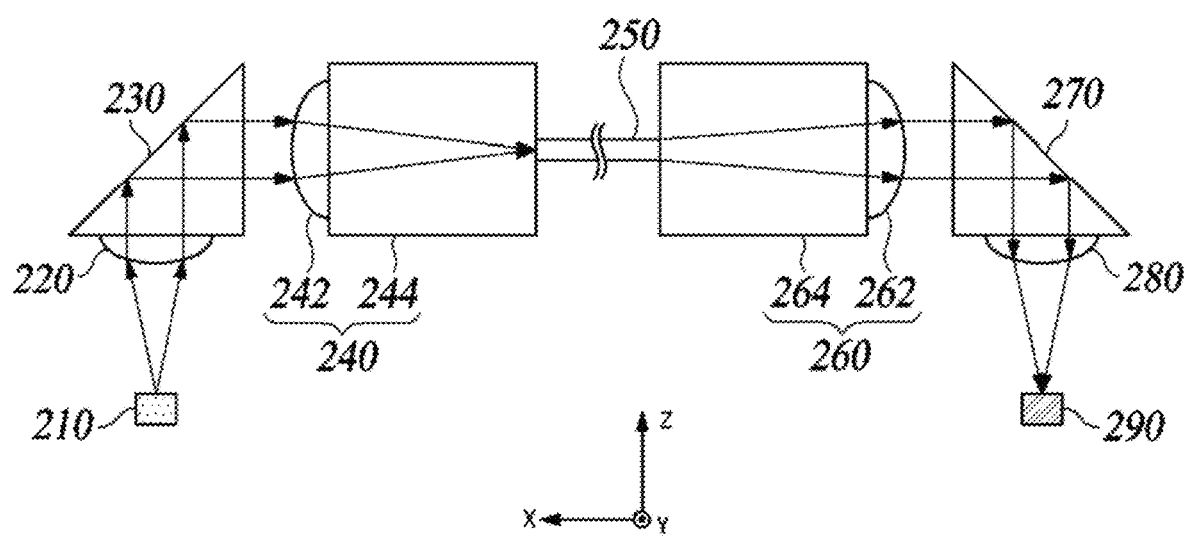
FIG. 2 is a schematic diagram of an optical system included in an optical assembly for optical transceiver according to at least one embodiment of the present disclosure.

FIG. 2 is a schematic diagram of an optical system included in an optical assembly according to at least one embodiment of the present disclosure.

The components of the optical system included in the optical assembly includes a transmitter collimator lens 220, a transmitter reflector 230 and a transmitter focusing lens unit 240. Here, the transmitter focusing lens unit 240 includes a transmitter focusing lens 242 and a transmitter spacer 244.

The transmitter collimator lens 220 changes light beams from an electrical-to-optical signal conversion or electrical-optical conversion element 210 to parallel light beams which are to be transmitted to the transmitter reflector 230. The transmitter reflector 230 changes the path of the parallel light beams from the transmitter collimator lens 220 by 90 degrees and sends them to the transmitter focusing lens 242. The transmitter spacer 244 may be configured to have a thickness in the x direction which corresponds to the focal length of the transmitter focusing lens 242, and thereby allowing the light beams to pass through the transmitter focusing lens 242 to converge on the core of an optical fiber 250.

The optical assembly according to at least one embodiment of the present disclosure is applicable to the optical receiver side, wherein the collimator lens and the focusing lens swap their functions. Hereinafter, a component including various individual functional elements will be referred to as an assembly.

Figure 3:
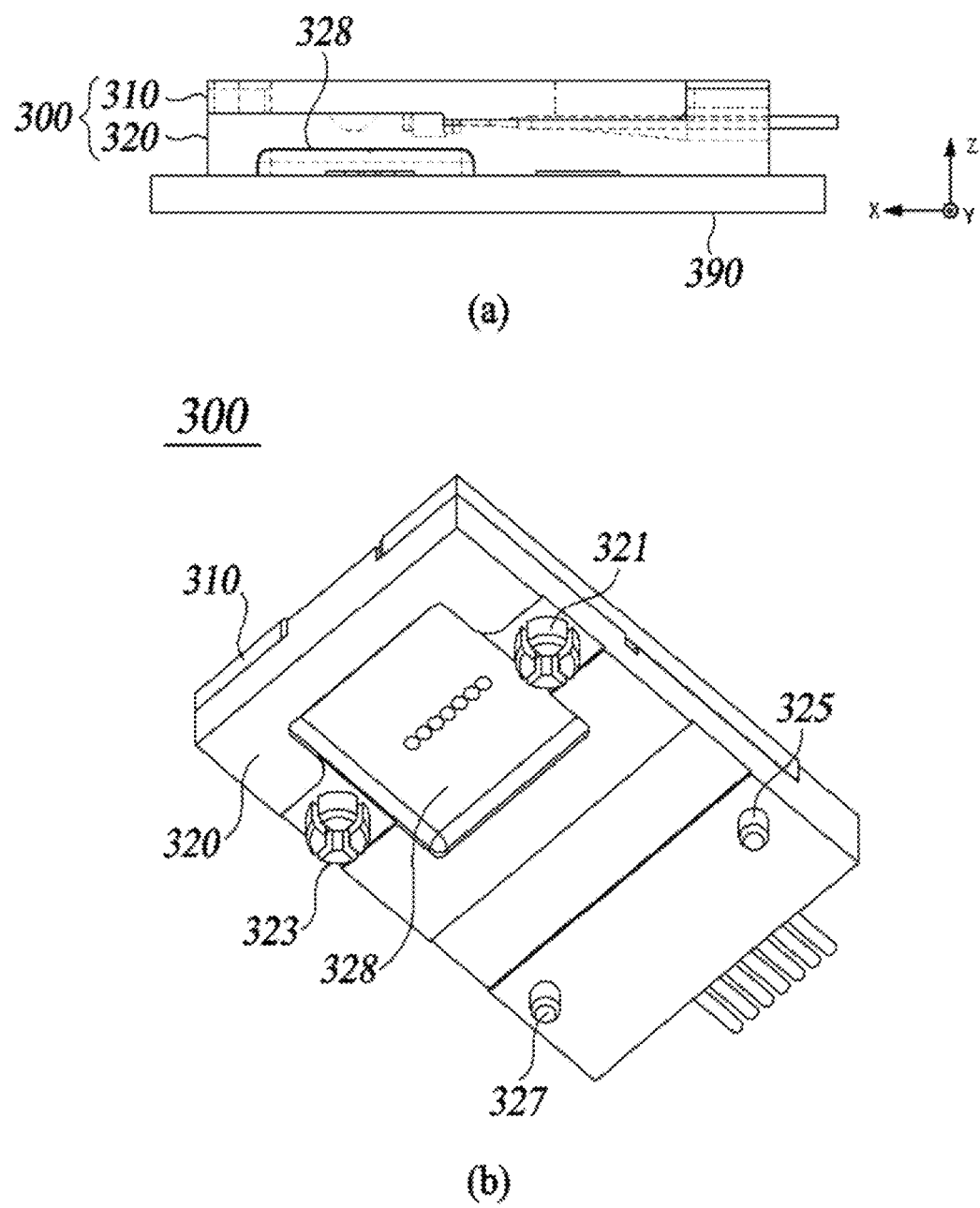
FIG. 3 is diagrams of an optical assembly for optical transceiver or simply an optical assembly, according to at least one embodiment of the present disclosure.

FIG. 3 is diagram of an optical assembly, according to at least one embodiment of the present disclosure.

An optical assembly for optical transceiver or simply an optical assembly 300, according to at least one embodiment of the present disclosure includes a cover assembly 310 and a body assembly 320. A substrate 390, on which the optical assembly is to be mounted, is formed with four accommodation holes (not shown), while the body assembly 320 is formed with a plurality, specifically a pair, of main posts 321, 323 and a plurality, specifically a pair, of sub-posts 325, 327 which are adapted to be directly coupled with the four accommodation holes, and thereby establishing highly reliable and efficient optical alignment between at least one electrical-optical conversion element 210 or at least one optical-electrical conversion element 290 and the body assembly 320. FIG. 3 does not show the at least one electrical-optical conversion element 210 or at least one optical-electrical conversion element 290. Hereinafter, the electrical-optical conversion element and the optical-electrical conversion element are commonly referred to as an optical element.

In addition, the optical assembly 300 includes a body encapsulation region 328. The body encapsulation region 328 serves to completely protect the electrical-optical conversion element, the optical-electrical conversion element, and various other electrical/electronic components and optical components from the outside. As shown in (a) and (b) of FIG. 3, the body encapsulation region 328 is a space formed by removing a predetermined region inside the lower surface of the body assembly 320 by a predetermined height. The body encapsulation region 328 has a ceiling where a first lens group 1L is disposed. Thus, by simply coupling the body assembly 320 with the substrate 390, various components disposed in the body encapsulation region 328 are protected from the outside.

Here, the at least one electrical-optical conversion element 210 or at least one optical-electrical conversion element 290 is disposed on the substrate 390 in a partial area thereof, which is included in the space defined by the body encapsulation region 380. Here, the first lens group 1L includes a plurality of lenses arranged in a row.

Figure 4:
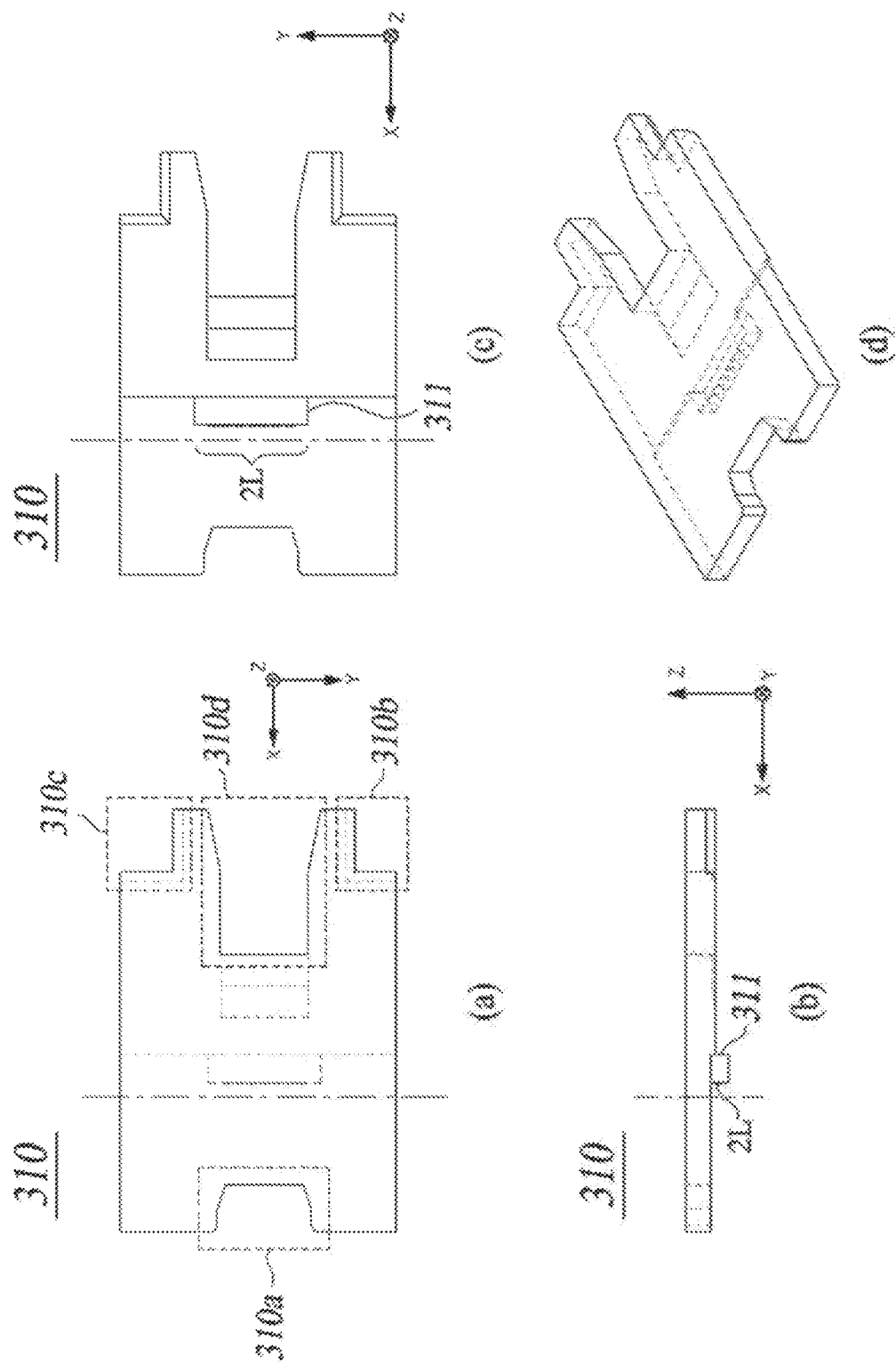
FIG. 4 is diagrams of a cover assembly of an optical assembly according to at least one embodiment of the present disclosure.

FIG. 4 is diagrams of a cover assembly of an optical assembly according to at least one embodiment of the present disclosure.

The cover assembly 310 of the optical assembly according to some embodiments of the present disclosure includes a first cover groove as generally bounded by a dotted rectangle 310a, a second cover groove 310b, a third cover groove 310c and a fourth cover groove 310d. The first cover groove 310a, the second cover groove 310b and the third cover groove 310c are coupled with the respective components of the body assembly 320 to be described with reference to FIG. 5, to assist in the horizontal optical alignment between a second lens group 2L formed on the body assembly 320 and a reflector 324 formed on the body assembly 320. Here, the horizontal alignment refers to alignments in the x direction and y direction shown in FIG. 4. The fourth cover groove 310d helps inserting at least one optical fiber 250 into the optical assembly 300. At least one optical fiber 250 is not shown in FIG. 4.

In addition, the cover assembly 310 includes a cover spacer 311 as well as the second lens group 2L. The second lens group 2L may be formed on one surface of the cover spacer 311. The second lens group 2L serves to focus the light beams from the reflector 324 of the body assembly 320 and to transmit the focused beams to at least one optical fiber 250 introduced from the outside. Here, it is assumed that d is the focal length of at least one lens included in the second lens group 2L. When the thickness of the cover spacer 311, that is, its length in the x direction is made to be equal to d, the light beams passing through the second lens group 2L are focused while passing through the cover spacer 311, and a point on the second interface of the cover spacer 311 becomes the point where the light beams are focused. In other words, the thickness of the cover spacer 311 is the focal length of the second lens group 2L. Therefore, the light beams passing through the second lens group 2L are naturally converged on the at least one optical fiber 250 which is in contact with the other surface of the cover spacer 311.

Figure 5:
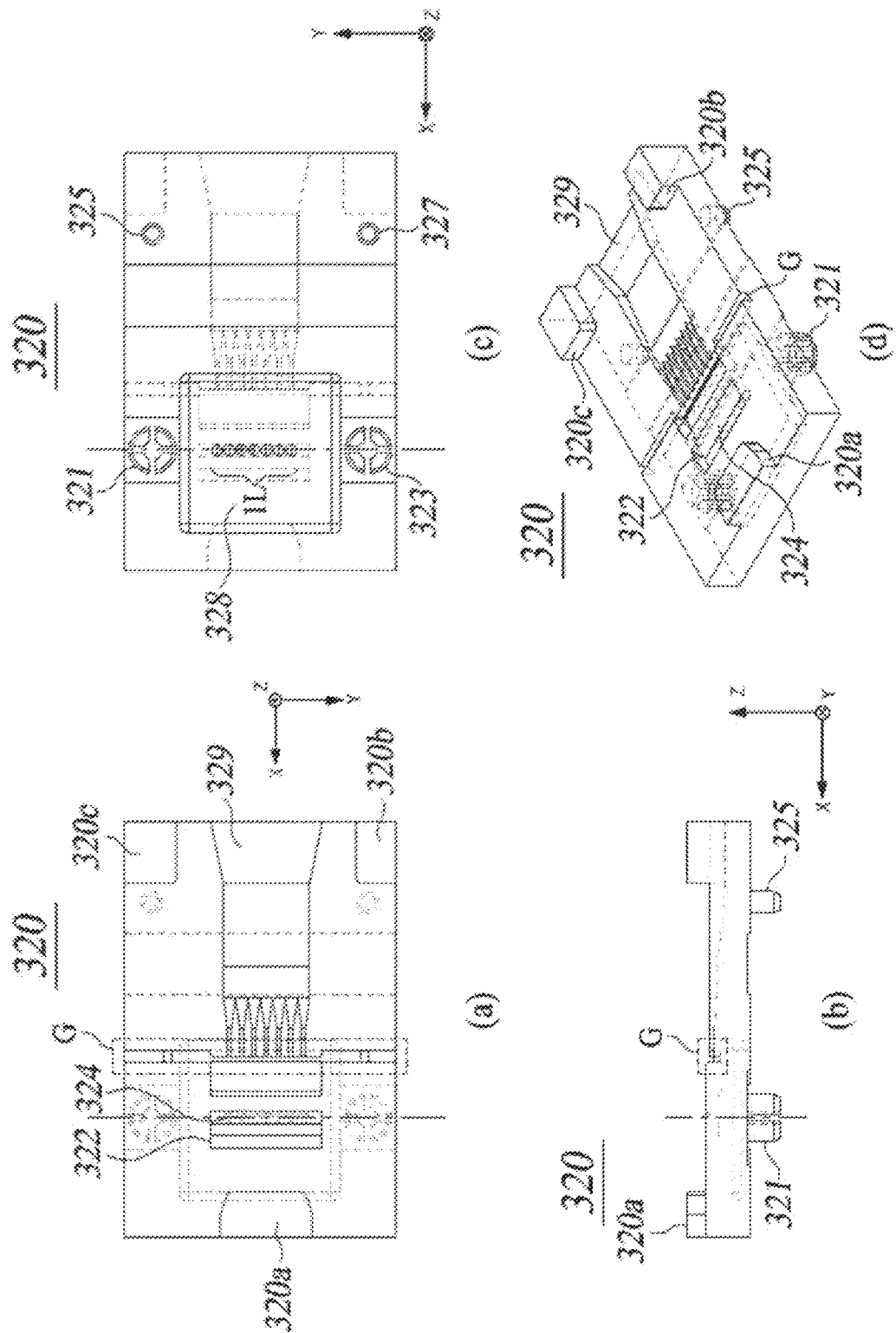
FIG. 5 is diagrams of a body assembly of an optical assembly according to at least one embodiment of the present disclosure.

FIG. 5 is diagrams of a body assembly of an optical assembly according to at least one embodiment of the present disclosure.

In some embodiments, the body assembly 320 of an optical assembly for optical transceiver includes a first body post 320a, a second body post 320b, a third body post 320c, a reflector forming groove 322, the reflector 324 and a surplus liquid guide groove G. The body assembly 210 also includes the main posts 321 and 323, the sub-posts 325 and 327, the body encapsulation region 328, an optical fiber guide 329 and the first lens group 1L.

Referring to FIG. 5 at (a), the first body post 320a, second body post 320b and third body post 320c of the body assembly 320 are engaged with the first groove 310a, second cover groove 310b and third cover groove 310c of the cover assembly 310, respectively, so that the cover assembly 310 can be fixated to be coupled with the body assembly 320. The first body post 320a, when engaged with the first cover groove 310a, supports the cover assembly 310 in the −x direction as well as fixates it in the y direction and the −y direction. The second body post 320b and the third body post 320c, when engaged with the second cover groove 320a and the third cover groove 330a, respectively, support the cover assembly 310 in the x direction as well as fixate it in the y direction and the −y direction.

The reflector forming groove 322 is formed in a predetermined region of the body assembly 320 to form the reflector 324. Formed below the reflector 324 is the first lens group 1L so that it can exchange optical signals with the electrical-optical conversion element or the optical-electrical conversion element disposed in the space protected by the body encapsulation region 328.

The surplus liquid guide groove G allows a bonding process to be performed by using epoxy, a refractive index matching material or the like for bonding the cover spacer 311 of the cover assembly 310 and at least one optical fiber introduced via the optical fiber guide 329 while they are in contact with each other, in order to block contamination that can be generated on the end face of the at least one optical fiber and to reduce the Fresnel reflection loss by minimizing the refractive index difference between the end face of the at least one optical fiber and the cover spacer 311. Through this process, the optical assembly according to at least one embodiment of the present disclosure can maximize optical coupling efficiency.

The pair of main posts 321 and 323 of the body assembly 320 are located on a virtual line formed to pass through the first lens group 1L, and they perform optical alignment between the first lens group 1L and the at least one electrical-optical conversion element or the at least one optical-electrical conversion element, either element being disposed on the substrate 390.

The pair of sub-posts 325 and 237 of the body assembly 320 assist the pair of main posts 321 and 323 when the body assembly 320 is coupled to the substrate 390 to reliably couple the body assembly 320 and the substrate 390 together.

Through the above-described optical alignment structure and method, precise control is achieved between the components of the optical transceiver according to embodiments of the present disclosure. Therefore, cost-effective, precise and easy optical alignment can be provided without time-consuming process, and the resultant optical transceiver can be mass-produced because it is assembled in a fully manual alignment method without expensive equipment.

Figure 6:
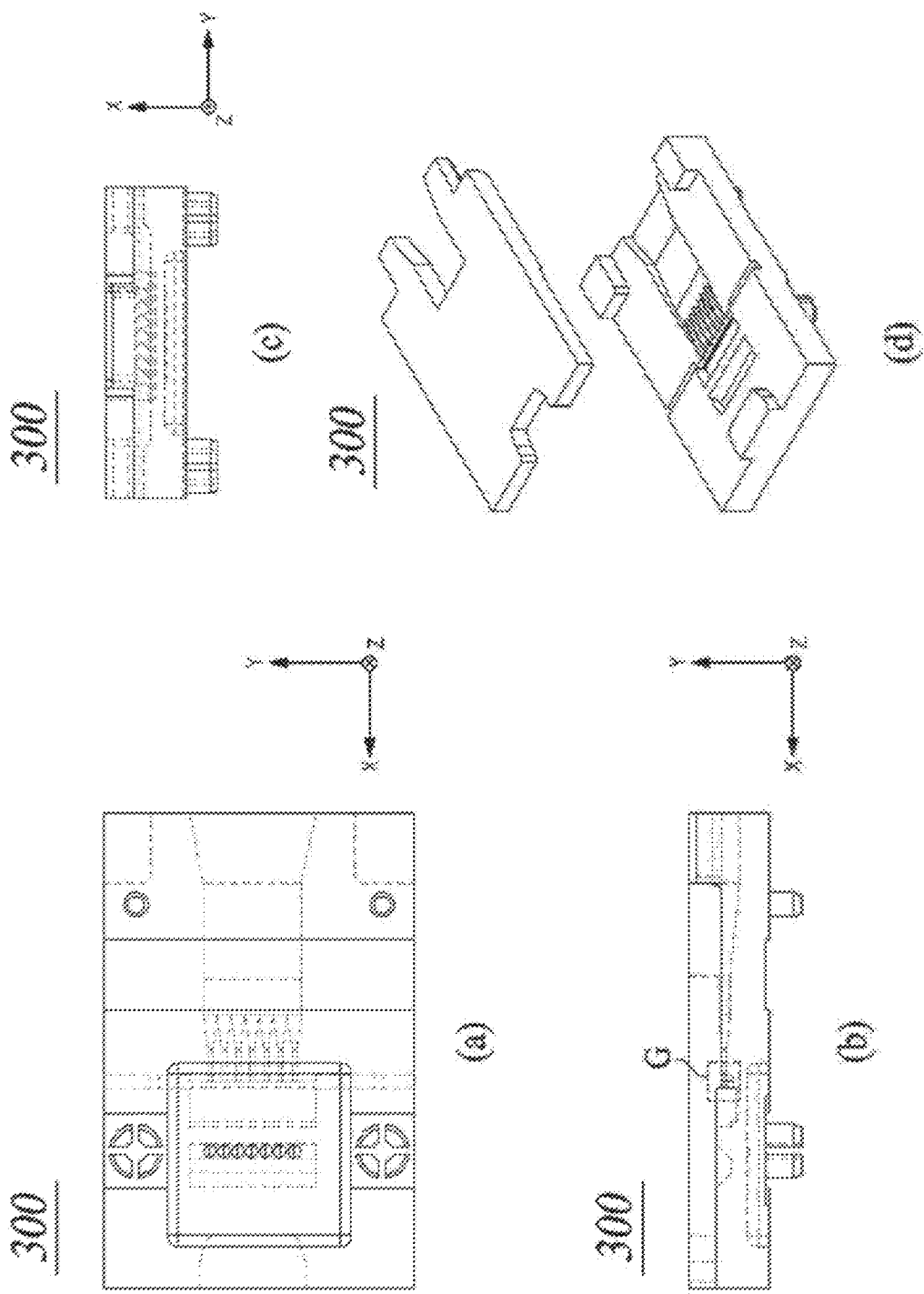
FIG. 6 is diagrams of a configuration of an optical assembly having a cover assembly and a body assembly coupled together, according to at least one embodiment of the present disclosure.

FIG. 6 is diagrams of a configuration of an optical assembly having a cover assembly and a body assembly coupled together, according to at least one embodiment of the present disclosure.

The cover assembly 310 is coupled to the body assembly 320 to form the optical assembly 300 which is then is mounted on the substrate 390 or other assembly. Coupling the body assembly 320 with the substrate 390 may precede coupling the cover assembly 310 with the body assembly 320.

Each of the cover assembly 310 and the body assembly 320 may be formed by using a synthetic resin through an injection molding or a three-dimensional printing process.

The substrate 390 may include a rigid printed circuit board made of a rigid material and capable of firmly supporting other components, and/or a flexible printed circuit board made of a soft material and capable of being bent or folded.

The substrate 390 may be mounted with at least one electrical-optical conversion element 210 or at least one optical-electrical conversion element 290, and a plurality of electric/electronic and optical components for driving thereof. In addition, various components are mounted for large-capacity optical transmission.

Figure 7:
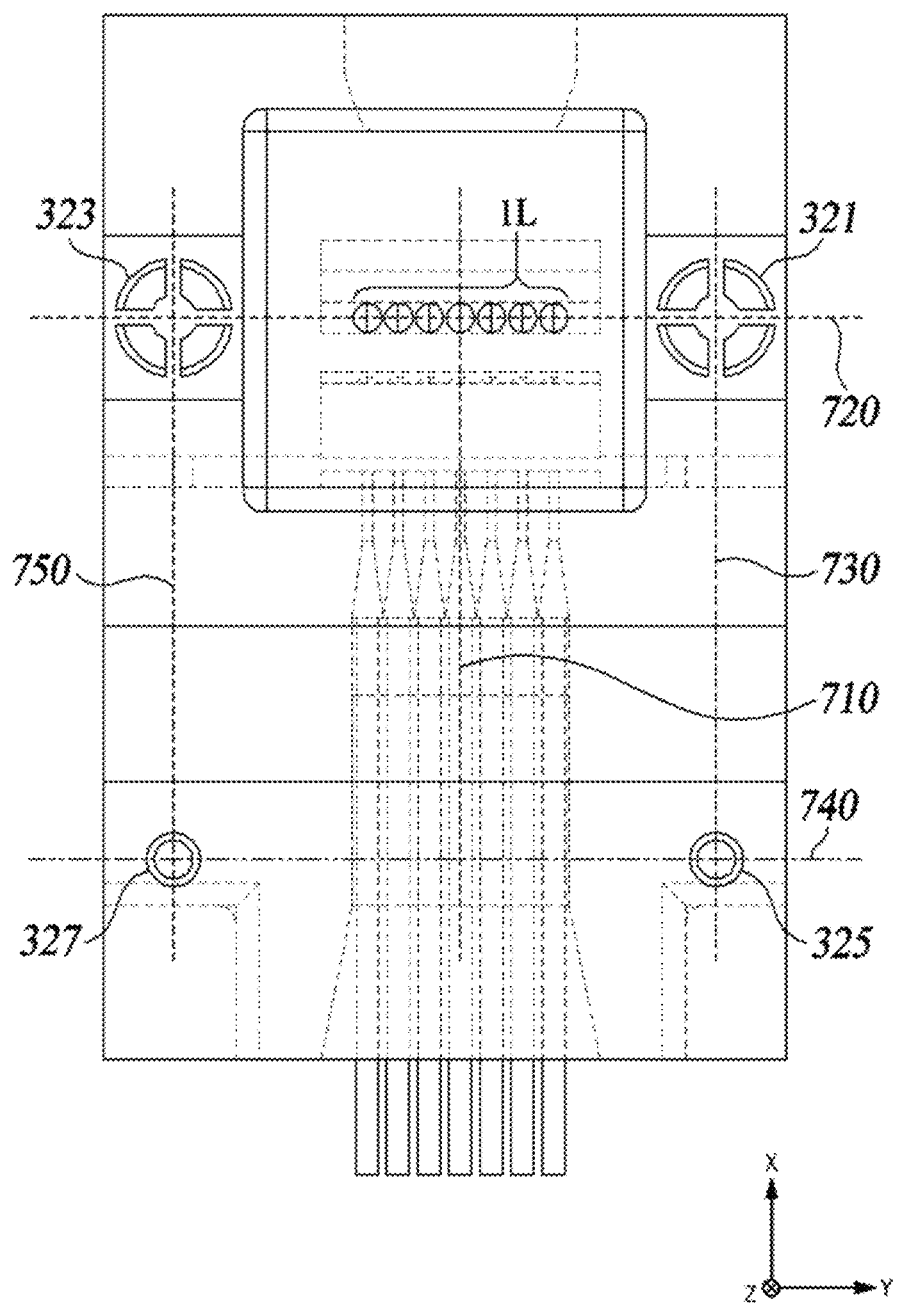
FIG. 7 is a bottom view of an optical assembly according to at least one embodiment of the present disclosure.

FIG. 7 is a bottom view of an optical assembly according to at least one embodiment of the present disclosure.

The optical assembly 300 for optical transceiver, according to at least one embodiment of the present disclosure includes a pair of main posts 321 and 323 and a pair of sub-posts 325 and 327 protruding downward from a lower surface of the body assembly 320. The pair of main posts 321 and 323 are formed to be symmetric with respect to a first lengthwise line 710 which is a longitudinal line bisecting the lower surface of the body assembly 320, when they are formed on a first widthwise line 720 which is a virtual line formed to pass through all the lenses included in the first lens group 1L. Thus, the pair of main posts 321 and 323 are positioned collinear with at least one optical element disposed at a position corresponding to the focal length of the first lens group 1L, which allows the body assembly 320 to be appropriately adjusted, to thereby adjust the optical alignment between the at least one optical element and the first lens group 1L.

The pair of sub-posts 325 and 327 to be formed may be positioned as follows. Among other lines extending perpendicular to the first widthwise line 720 virtually passing through all the lenses in the first lens group 1L, two virtual lines that pass through the pair of main posts 321 and 323 are designated as a second lengthwise line 730 and a third lengthwise line 750. Formed in parallel with the first widthwise line 720 at a position separated from the first widthwise line 720 by a predetermined distance is a second widthwise line 740. The pair of sub-posts 325 and 327 are formed on two intersections between the second lengthwise line 730 and the second widthwise line 740, and between the third lengthwise line 750 and the second widthwise line 740. The pair of sub-posts 325 and 327 assist the pair of main posts 321 and 323 for allowing the at least one optical element to be optically aligned with the first lens group 1L when the body assembly 320 is coupled with the substrate 390.

The pair of main posts 321 and 323 formed to protrude from the lower surface of the body assembly 320 are fixedly inserted in a plurality of main accommodation holes (not shown) formed at positions in the substrate, corresponding to the pair of main posts 321, 323 when the body assembly 320 is coupled to the substrate 390. Between the first lens group 1L of the body assembly 320 and the one or more optical elements disposed on the substrate, the x-direction optical coupling is achieved by side-by-side arrangement of the one or more optical elements on a virtual line that passes through the plurality of main accommodation holes formed in the substrate.

The pair of sub-posts 325 and 327 each has a circular cross-section with the diameter at the lowermost point thereof determined to be smaller than that at its uppermost point, to facilitate inserting the sub-posts in the substrate 390 when they are coupled with the substrate 390.

Referring to FIG. 7 together with FIG. 4, the second lens group 2L to be formed on the cover assembly 310 is positioned with reference to an imaginary straight line bisecting the first cover groove 310a in the x direction and to such side that defines the first cover groove 310a and extends in parallel with the y direction, among other sides of the first cover groove 310a. Further providing the cover spacer 311 with an appropriate thickness in the x direction, adjusted to the focal length of each lens included in the second lens group 2L establishes the optical coupling from the reflector 324 to the second lens group 2L and the optical coupling from the second lens group 2L via the cover spacer 311 to the at least one optical fiber 250. Accordingly, coupling the cover assembly 310 to the body assembly 320 completes the optical coupling established through an interconnection between the at least one optical element, the first lens group 1L, the reflector 324, the second lens group 2L and the at least one optical fiber 250.

Figure 8:
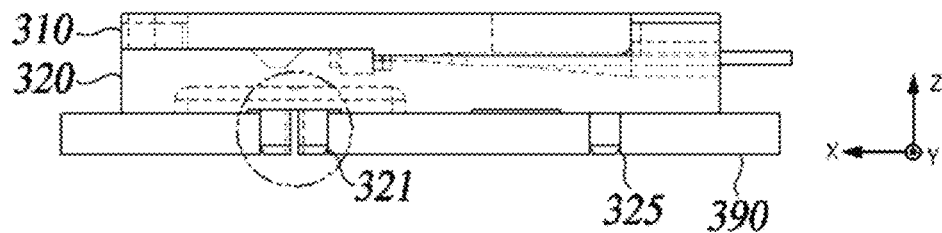
FIG. 8 is a side view of a configuration of an optical assembly coupled to a substrate, according to at least one embodiment of the present disclosure.

FIG. 8 is a side view of a configuration of an optical assembly coupled to a substrate, according to at least one embodiment of the present disclosure.

The optical assembly 300 according to at least one embodiment of the present disclosure is fastened to the substrate 390 by inserting the pair of main posts 321, 323 formed to protrude from the lower surface of the body assembly 320 in the main accommodation holes formed in the substrate.

The cover assembly 310 and the body assembly 320 when coupled together, form the optical assembly 300 which is then mounted on the substrate 390 or other assembly. Coupling the cover assembly 310 to the body assembly 320 may come after coupling the body assembly 320 with the substrate 390.

The substrate 390 may be mounted with one or more electrical-optical conversion elements 210 or one or more optical-electrical conversion elements 290, and a plurality of electric/electronic and optical components for driving thereof. In addition, various components for large-capacity optical transmission are mounted.

The electrical-optical conversion elements 210 or optical-electrical conversion elements 290 and a plurality of electric, electronic and optical components for driving thereof are arranged on the substrate 390, to which the optical assembly 300 are coupled, to finally complete an optical transceiver.

Figure 9:
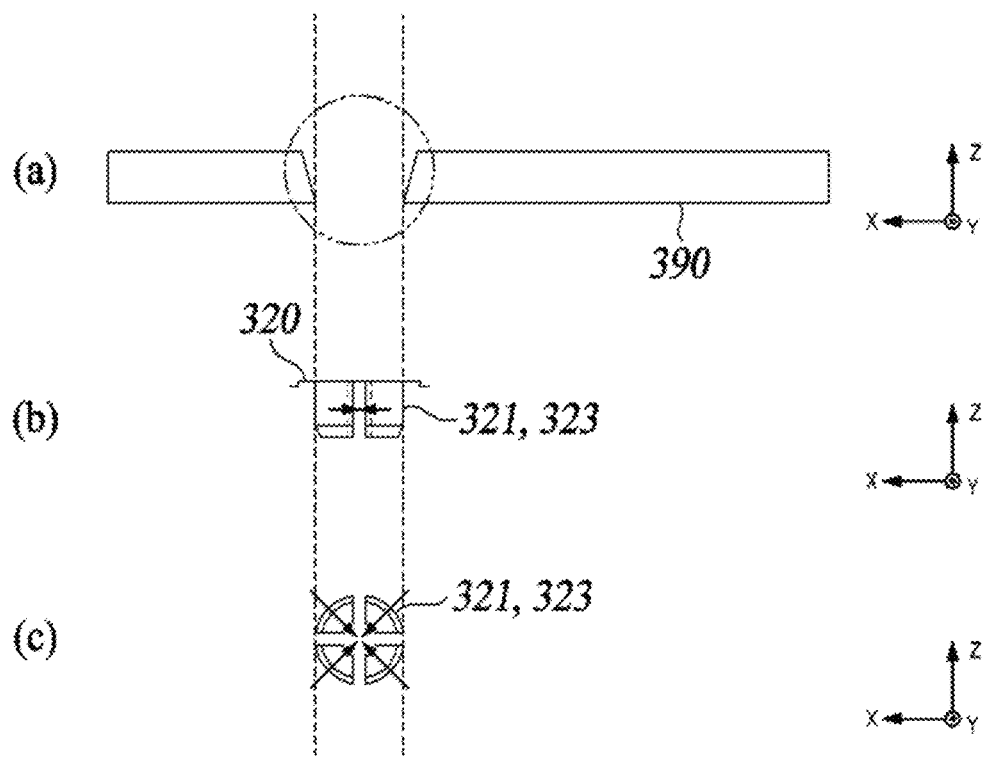
FIG. 9 is a view for explaining the principle of coupling an optical assembly to a substrate, according to at least one embodiment of the present disclosure.

FIG. 9 is a view for explaining the principle of coupling an optical assembly to a substrate, according to at least one embodiment of the present disclosure.

FIG. 9 shows at (a) a side view of the substrate 390. The substrate 390 may be formed to have a plurality of accommodation holes that become narrower from the top to the bottom.

FIG. 9 shows at (b) and (c) a side view and a bottom view of a pair of main posts 321 and 323, respectively. The pair of main posts 321, 323 are formed protruding from the lower surface of the body assembly 320.

Each of the pair of main posts 321 and 323 has a hollowed-out cylinder composed of a first cylinder having a first diameter and a hollow formed by a concentric second cylinder having a second diameter that is smaller than the first diameter. Then, at least two openings are formed through the first cylinder to communicate between outer circumferential surfaces of the first cylinder and the center of the first cylinder so that the hollow is exposed externally in radial directions from the center. Here, the openings may be formed at predetermined angles along the outer circumferential surfaces of the first cylinder having the hollow. For example, as shown in FIG. 9, when the openings are each formed at every 90 degrees along the outer circumference, the first cylinder including the hollow will be divided into four columns. When the openings are each formed at every 60 degrees along the outer circumference, the first cylinder including the hollow will be provided with six divided columns.

With the hollows and openings formed respectively in the pair of main posts 321 and 323, 390, coupling the body assembly 320 to the substrate 390, that is, inserting the pair of main posts 321 and 323 in the accommodation holes formed on the substrate 390 causes the divided columns respectively constituting the pair of main posts 321, 323 to yield under a force toward the center of the divided columns, until they enter the accommodation holes. In order to utilize this property, the body assembly 320 including the pair of main posts 321 and 323 is preferably formed of a synthetic resin having a certain degree of elasticity. However, the material of the body assembly 320 is not limited thereto. With the plurality of main posts 321, 323 configured to have such feature, the precise optical alignment is achieved between at least one electrical-optical conversion element 210 or optical-electrical conversion element 290 disposed on the substrate 390 and the optical assembly 300 for optical transceiver.

On the other hand, the surface on which the regions where the pair of main posts 321 and 323 are protruded is formed to have stepped portions with a predetermined depth elevated above the contact surface of the body assembly 320 when engaged with the substrate 390. Thus, even when the optical assembly 300 is coupled to the substrate 390, the body assembly 320 maintains non-contact regions formed on at least the surface thereof where it forms a border with the pair of main posts 321 and 323. The non-contact region is called an anti-delamination region.

When the optical assembly 300 is coupled to the substrate 390, the pair of main posts 321 and 323 may be deformed, which could cause the lower surface of the body assembly 320 adjacent to the main posts 321, 323 to be separated from the substrate 390. Such a phenomenon will be eliminated by the formation of anti-delamination region.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An optical assembly for use with an optical transceiver and for mounting on a substrate, the optical assembly comprising:
    a body assembly comprising:
        a reflector configured to change a traveling direction of light moving in a z direction perpendicular to a plane formed by the substrate to a −x direction parallel to the substrate,
        a first lens group disposed between at least one optical element and the reflector to optically couple the at least one optical element and the reflector,
        a body hole that is an empty space formed at a position spaced apart from the reflector by a predetermined distance,
        a surplus liquid guide groove configured to be adjacent to the body hole, to be elongated in a y direction or a −y direction, penetrating a side of the body assembly, and to drain out an overflow of liquid introduced into the body hole only toward the side of the body assembly, wherein the bottom of the surplus liquid guide groove is configured to be higher than the bottom of the body hole; and
        a plurality of main posts formed on a first widthwise line that is a virtual line formed to pass through all lenses included in the first lens group, and
        at least two sub-posts formed on a first lengthwise line and a second lengthwise line that are two virtual lines formed perpendicular to the first widthwise line, wherein one of the sub-posts is formed on the first lengthwise line and another of the sub-posts is formed on the second lengthwise line; and
    a cover assembly comprising:
        a cover spacer inserted in the body hole in a −z direction, and
        a second lens group arranged on one side of the cover spacer, for optically coupling at least one optical fiber inserted from an outside in an x direction,
    wherein an optical path is established seamlessly from the at least one optical element to the at least one optical fiber through the first lens group, the reflector, the second lens group and the cover spacer in order, by coupling between the cover assembly and the body assembly, with a lower side portion of the cover assembly abutting an upper side portion of the body assembly, and
    wherein each of the plurality of main posts comprises:
        a combination of a plurality of columns collectively having a cross-sectional shape formed by a ring-shaped figure which is composed of a first circle having a first diameter, and a circular hollow formed by a concentric circle having a second diameter that is smaller than the first diameter, and further includes at least one rectangular hollow having a first pair of opposite sides that are equal to the first diameter and a second pair of opposite sides that are smaller than the first diameter, to allow the body assembly to be repositioned in all lateral directions in parallel with the substrate when the body assembly is coupled to the substrate, whereby allowing one or more of the optical elements to be each optically coupled with each lens included in the first lens group.

2. The optical assembly of claim 1, wherein the body assembly comprises:
    a first body post, a second body post and a third body post formed at positions corresponding to a first cover groove, a second cover groove and a third cover groove, respectively, to facilitate the coupling between the cover assembly and the body assembly.

3. The optical assembly of claim 2, wherein the first body post is configured to fix the first cover groove in the y direction and the −y direction as well as support the first cover groove in the −x direction, and the second body post and the third body post are configured to support the second cover groove and the third cover groove in the y direction and the −y direction, respectively and in the x direction commonly, for allowing the cover assembly to be tightly coupled with the body assembly when the cover assembly is coupled with the body assembly.

4. The optical assembly of claim 3, wherein one or more of the optical elements are each optically coupled with each lens included in the first lens group by a plurality of main accommodation holes formed at positions in the substrate, corresponding to the plurality of main posts, and the at least one optical element disposed between the main accommodation holes, by coupling between the body assembly and the substrate.

5. The optical assembly of claim 4, wherein the at least two sub-posts are configured to assist the plurality of main posts for allowing one or more of the optical elements to be each optically coupled with each lens included in the first lens group, when the body assembly is coupled with the substrate.

6. The optical assembly of claim 5, wherein the second lens group is formed based on a virtual straight line bisecting the first cover groove in the x direction, the first vertical line, the second vertical line and a thickness of the cover spacer along the x-direction, so that coupling between the cover assembly and the body assembly establishes an seamless optical coupling from the at least one optical element to the at least one optical fiber through the first lens group, the reflector and the second lens group in order.

7. The optical assembly of claim 6, wherein each of the plurality of main posts comprises:
- a hollowed-out cylinder composed of a first cylinder having a first diameter and a hollow formed by a concentric second cylinder having a second diameter that is smaller than the first diameter, and
- at least two openings formed through the first cylinder at predetermined angles to communicate between outer circumferential surfaces of the first cylinder and a center of the first cylinder so that the hollow is exposed externally in radial directions from the center.

8. The optical assembly of claim 6, wherein the body assembly has a lower surface comprising:
- an anti-delamination region formed by stepping the body assembly at least partially where the plurality of main posts protrude from, to prevent the body assembly from lifting from the substrate when the body assembly is pressurized locally at junction between at least one of the plurality of main posts under a pressure in a horizontal direction parallel to the substrate while the body assembly is coupled to the substrate.

* * * * *